Dec. 26, 1950  C. W. PORTER  2,535,548
FOLDABLE ROASTING SPIT
Filed Feb. 16, 1948
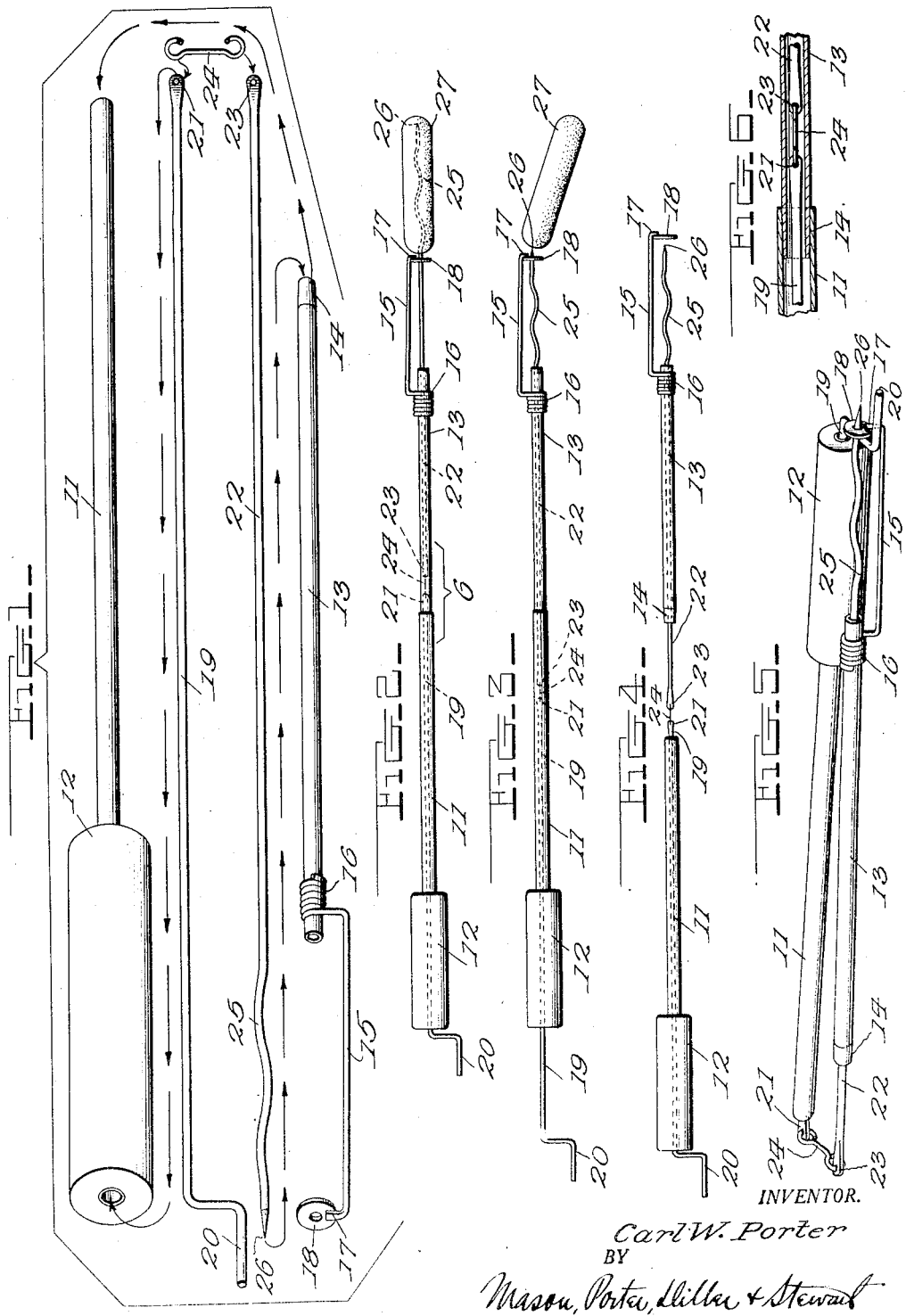
INVENTOR.
Carl W. Porter
BY
Mason, Porter, Miller + Stewart
attys.

Patented Dec. 26, 1950

2,535,548

UNITED STATES PATENT OFFICE 2,535,548

FOLDABLE ROASTING SPIT

Carl W. Porter, Alexandria, Va.

Application February 16, 1948, Serial No. 8,550

2 Claims. (Cl. 99—421)

The following specification sets out in detail my invention in improvements in foldable roasting spits of the type generally used for broiling meat and other food articles over an open fire. When camping, on picnics or other outings it is always desirable to have a convenient, simple and effective implement for roasting food. At the same time it is most desirable that the person handling the implement may do so from a comfortable distance from the fire. It is usual to provide long handled implements by which the food can be held in position while being shifted over the fire and manipulated to get even heating. However, such are awkward to carry and leave much to be desired.

It is an object of my invention to provide an improved roasting implement that is convenient to use and yet avoids the necessity of handling the hot food and the heated end of the implement. It is also an object of my invention to facilitate even and uniform cooking.

It is a further object of my invention to provide an implement which supplies the desired length but at the same time can be folded or collapsed to facilitate packing, shipping and handling.

A still further object of my invention is to produce an implement which will be economical and easy to manufacture.

These and other objects of my invention are accomplished by providing a rotatable roasting spit, the parts of which can be disjointed and folded into a small compass for carrying. Incidental thereto, the device is rendered safe for handling in its collapsed form.

As illustrating the preferred form of my invention, I have shown the improved device on the accompanying drawings in which:

Fig. 1 is an exploded plan view on an enlarged scale of the disassembled roasting spit of improved design;

Fig. 2 is side view of the spit in operative position;

Fig. 3 is a similar view of the device with the point retracted;

Fig. 4 is a side view of the disjointed spit;

Fig. 5 is a perspective view of the disjointed device with the ends latched together and Fig. 6 is an enlarged longitudinal section of the foldable joint parts.

Briefly described, the invention consists in a tubular shaft with a handle at one end and jointed so as to be foldable approximately in the middle. This tubular handle carries a jointed rod or crankshaft which is also adapted to be folded in two substantially equal sections for carrying purposes. When this is disjointed the guide or ejector mounted on the end of the shaft opposite the handle is also useful as a keeper or latch for the pointed end of the inner crankshaft rod.

In the preferred form I have illustrated a tubular shaft section 11 at one end of which there is a handle 12. A second tubular end section 13 is provided somewhat shorter than the handle section. The end section 13 is tapered at one end as shown at 14 to form a friction fit within the adjacent end of the shaft 11. In this way a hollow rigid shaft is provided.

The tubular end section 13 carries a resilient wire guide 15 at its free end. This guide serves also as an ejector for the toasted food and is also useful in latching the sections of the tubular handle in inoperative position. The guide 15 has a coil 16 wrapped around the free end of the end section 13 and is held in position by the constriction of the coil. The opposite end of the guide 15 is bent at right angles to form a tab 17. A ring or collar 18 is welded or otherwise attached to the tab 17. The ring may be integral with the guide 15 and formed by twisting the latter into the desired form.

The shaft 11 carries a loosely rotatable rod 19. This rod is longer than the shaft section 11 so that it projects normally at each end of the latter. The end of the rod 19 projecting from the handle end of the shaft is formed with a crank 20. The opposite end of the rod 19 is formed with an eye 21 which projects beyond the end of the shaft 11 when the crank 20 is against the handle.

An extension rod 22 is provided. This is of metal preferably one which will not contaminate the food. It has an eye 23 at one end. A link 24 connects the eyes 21 and 23.

The free end of the extension rod 22 has an undulatory section 25 which normally projects beyond the free end of the collar 18. The lateral displacement of the inner undulation 25 is such that it forms a stop to the retraction of the extension rod in the tubular end section 13.

The end of the extension rod 22 is formed into a point 26, sharp enough to impale a link sausage or the like.

The relative position of the ejector 15, the outer end of section 13 and the inner undulation 25 is such that when the extension rod 22 is fully retracted the point 26 is not withdrawn completely from the ring 18.

The parts of the device are assembled by first inserting rod 19 in the tubular handle section 11 and extension rod 22 in the tubular end section 13 with the eyes 21 and 23 extending freely from the adjacent ends of the shaft sections.

The link 24 is then permanently attached in the eyes 21 and 23.

In this position it is immaterial whether the point 26 is or is not engaged in the ring 18.

To place the device in operative position the tapered end 14 of the end section 13 is fitted securely by friction or otherwise within the adjacent end of the handle section 11. If the crank 20 is moved to its extreme position away from handle 12, the inner undulation of section 25 will rest against the outer end of 13. By turning coil 16 as if to unwind it, it will be loosened slightly on 13 and 15 may be slid outward and/or inward as required to slip 18 over the point 26. The crank 20 may then be moved to its position nearest the handle 12, which will result in projecting the extension rod 22 with its undulatory end beyond ring 18 and the link 24 will be entirely within section 13 as shown by dotted lines in Figure 2. This is the operating position of the device. It permits link sausage or other articles of food to be impaled and held over an open fire. The user holds the device from a distance by means of the handle 12 and can conveniently turn the impaled article in the customary manner.

After the sausage 27 or other article is suitably cooked the user will withdraw the crank in the manner shown in Fig. 3. In this position the undulatory section 25 is drawn through the ring 18. The latter then becomes an ejector which pushes the article off the rod 22. In this movement the inner undulation of section 25 is brought against the end section 13 before the point 26 is retracted out of engagement of the ring 18. In this movement the link 24 transverses the friction joint between the shaft sections and takes the position shown in Fig. 3.

In Fig. 4 I have shown the method of disjointing or disassembling the device. Here the crank rod 19 is left in its advanced position with the eyes 21 and 23 extended beyond the end of section 11. Section 13 is then unfastened from section 11 and slid over extension rod 22 until it strikes the first undulation of section 25. In this movement the point 26 is not withdrawn from the ring 18. By loosening 16 and sliding 15 outward as above described, point 26 may be withdrawn from 18.

The sections 11 and 13 may then be folded into substantial parallelism as shown in Fig. 5. When this is done the crank 20 rests against the guide 15 and behind the ring 18. The point 26 is then advanced on the opposite side of the crank and engaged in the ring 18 by sliding again loosening 16 and sliding 15 inward. Thus a latch is formed to hold the crank and handle in position. The device is then compact and securely arranged for storage or transport.

The improved implement above described is simple in structure and cheap in cost. It is rugged in use. Due to the foldable feature it can be stored and carried compactly. The mode of locking the parts together in folded condition makes it safe to handle.

I have illustrated and described my preferred form of the device without limitation however to changes in materials, proportions or structural details other than as defined by the scope of the appended claims.

What I claim is:

1. A roasting implement comprising a tubular shaft having two detachable sections, a handle on one section, a guide projecting from the other section, a jointed rod slidably extending through the shaft, a crank on the rod beyond the handle, and an undulating extension on the other end of the rod for sliding movement through the guide, said second shaft section forming a stop for the undulating extension when retracted out of the guide.

2. A roasting implement comprising a tubular shaft having two detachable sections, a handle on one section, a guide having an offset portion projecting longitudinally from the other section, an apertured portion on the end of the guide and axial of the shaft, a jointed rod slidably extending through the shaft, a crank on the rod beyond the handle, and an article-holding extension on the other end of the rod, projectable through the guide and serving with the said offset portion as a latch for the crank when the shaft sections are detached from each other and the rod bent at its joint.

CARL W. PORTER.

REFERENCES CITED

The following references are of record in the file of this patent:

UNITED STATES PATENTS

| Number | Name | Date |
|---|---|---|
| D. 28,446 | Richardson | Apr. 5, 1898 |
| 1,401,096 | Neudeck | Dec. 20, 1921 |
| 1,888,616 | Bocchino | Nov. 22, 1932 |
| 2,004,659 | Groch | June 11, 1935 |
| 2,315,143 | Thompson | Mar. 30, 1943 |
| 2,345,049 | Hunter | Mar. 28, 1944 |
| 2,442,551 | Schaefer et al. | June 1, 1948 |

FOREIGN PATENTS

| Number | Country | Date |
|---|---|---|
| 9,043 | Great Britain | May 16, 1900 |